(12) United States Patent
Marcellus

(10) Patent No.: US 6,543,575 B1
(45) Date of Patent: Apr. 8, 2003

(54) DOUBLE-WALLED STRUCTURE AND CONNECTION ARRANGEMENT

(75) Inventor: Dwight A. Marcellus, Newport News, VA (US)

(73) Assignee: Lindab AB, Bastad (SE)

(*) Notice: Subject to any disclaimer, the term of this patent is extended or adjusted under 35 U.S.C. 154(b) by 0 days.

(21) Appl. No.: 09/594,113

(22) Filed: Jun. 14, 2000

(51) Int. Cl.[7] .................................................. E04F 17/04
(52) U.S. Cl. ........................ 181/224; 181/227; 181/228; 138/148; 137/312
(58) Field of Search ............................... 181/224, 227, 181/228; 138/148, 149; 137/312

(56) References Cited

U.S. PATENT DOCUMENTS

| | | | |
|---|---|---|---|
| 1,643,008 A | 9/1927 | Fentress | 72/135 |
| 2,937,436 A | 5/1960 | Butler et al. | 29/419 |
| 3,474,514 A | 10/1969 | Lombardi | 72/50 |
| 3,487,537 A | 1/1970 | Lombardi | 29/477.7 |
| 3,507,354 A | * 4/1970 | Dieckmann et al. | 181/224 |
| 3,694,892 A | 10/1972 | Hale | 72/49 X |
| 3,903,928 A | 9/1975 | Sykes et al. | 138/149 X |
| 3,974,013 A | 8/1976 | Roos | 29/446 X |
| 3,981,378 A | 9/1976 | Potter | 181/252 |
| 3,997,098 A | 12/1976 | Van Patten | 29/890.048 |
| 4,034,826 A | 7/1977 | Andrews | 181/36 |
| 4,160,312 A | 7/1979 | Nyssen | 29/429 |
| 4,356,885 A | * 11/1982 | Dello | 181/227 |
| 4,387,498 A | 6/1983 | Morhard | 29/435 X |
| 4,502,370 A | 3/1985 | Baileys et al. | 98/60 |
| 4,823,579 A | 4/1989 | Castricum | 72/49 |
| 5,162,622 A | 11/1992 | Malmsten | 181/227 |
| 5,193,374 A | 3/1993 | Castricum | 72/49 |
| 5,260,523 A | 11/1993 | Pettersson et al. | 181/224 |
| 5,325,893 A | 7/1994 | Takagi et al. | 138/143 |
| 5,461,777 A | 10/1995 | Ideda et al. | 29/890.08 |
| 5,479,706 A | 1/1996 | Tamano et al. | 29/890.08 |
| 5,605,024 A | 2/1997 | Sucato et al. | 52/696 |
| 5,670,756 A | 9/1997 | Ohtaka et al. | 181/256 |
| 5,720,095 A | 2/1998 | Lennartsson | 29/509 |
| 5,722,149 A | 3/1998 | Lesage et al. | 29/33 D |
| 5,737,832 A | 4/1998 | Bubb | 29/781 |
| 5,795,634 A | 8/1998 | Fukui | 138/129 |
| 5,801,342 A | 9/1998 | Hultberg et al. | 181/224 |
| 5,881,442 A | 3/1999 | Hultberg et al. | 39/33 D |
| 5,911,457 A | 6/1999 | Hultberg et al. | 29/890.14 |
| 6,062,270 A | 5/2000 | Hultberg et al. | 138/129 |

FOREIGN PATENT DOCUMENTS

| | | |
|---|---|---|
| CH | 206768 | 8/1939 |
| CH | 652869 | 3/1979 |
| EP | 546790 A1 | 6/1993 |

(List continued on next page.)

OTHER PUBLICATIONS

"Lindab*Silencer*", brochure, Lindab Ltd., 1988.
"Ventilation 95 Manual and catalogue", Lindab, 1995.

*Primary Examiner*—Shih-Yung Hsieh
(74) *Attorney, Agent, or Firm*—Weingarten, Schurgin, Gagnebin & Lebovici LLP

(57) ABSTRACT

There is provided a double-walled structure for coupling to another double-walled structure. The coupling connects one female end portion of the one structure and one male end portion of the other structure together. The connecting requires only connecting of the outer walls of the structures together, providing an overlapping connection. The inner walls of the structures have a gap between their ends, when connected. Thereby the coupling of the structures is facilitated. The space between the inner wall and outer wall of the structure is occupied by an insulating material, such as a sound absorbing fibrous batting. The space between the male/female end portions for connection to a female/male end of another structure is filled by a seal, preventing loss of insulating material and providing insulation of the joint coupling the double-walled structures together. The structure can be used, especially, as a segment in a sound-absorbing ductworks system.

11 Claims, 4 Drawing Sheets

FOREIGN PATENT DOCUMENTS

| | | |
|---|---|---|
| FR | 1146971 | 11/1957 |
| FR | 1307015 | 9/1962 |
| FR | 2 566 095 | 12/1985 |
| GB | 2 030 278 A | 4/1980 |
| GB | 1574480 | 9/1980 |
| GB | 2122256 | 1/1984 |
| JP | 57-154314 | 9/1982 |
| JP | 58-58928 | 4/1983 |
| JP | 1211608 | 8/1989 |
| SE | C-509 330 | 1/1999 |
| WO | WO 94/07620 | 4/1994 |
| WO | WO 97/09496 | 3/1997 |
| WO | WO 98/17412 | 4/1998 |

* cited by examiner

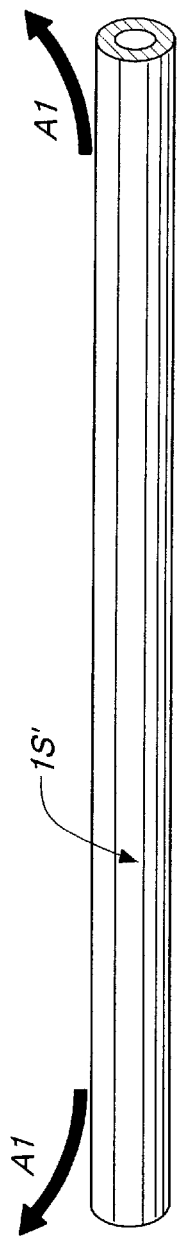
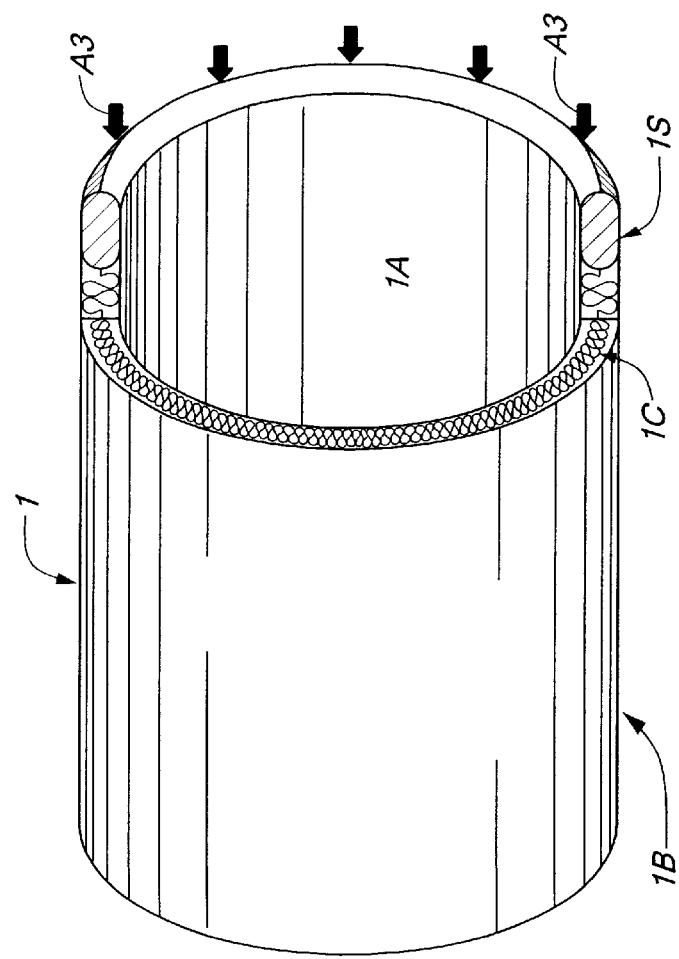
Fig. 4a
Fig. 4b
Fig. 4c

DOUBLE-WALLED STRUCTURE AND CONNECTION ARRANGEMENT

FIELD OF THE INVENTION

The invention relates to a double-walled structure, such as double-walled segment, preferably for use in ventilation ductwork systems. The invention also relates to a connection arrangement for coupling together two double-walled segments, preferably for use in a ventilation ductwork system.

BACKGROUND OF THE INVENTION

Double-walled structures for use in ventilation duct systems are well known in the art. Such double-walled structures may be comprised of a one piece straight elongated duct, an elbow, a connecting element, a silencer, etc. "Double-walled structure" refers to a structure having an inner tube forming an inner wall of the structure, and an outer casing, being spaced from the inner wall and forming the outer wall of the structure. The space between the inner and outer walls is filled by insulating material, e.g. a sound insulating or absorbing material. In U.S. Pat. No. 5,801,342, the specification of which is hereby incorporated by reference, a sound absorbing double-walled structure is disclosed, having its inner tube or inner wall formed in the shape of a helically-wound lock-seam tubing and an outer casing, and having its outer casing or outer wall typically also formed of a helically-wound lock-seam tubing. The inner tube is perforated, and the sound absorbing material in the space between the inner tube and the outer casing is preferably wool.

It is understood that installation of duct systems, including double-walled duct systems for ventilation purposes, in buildings, mostly requires coupling together of two similar or different segments, such as straight elongated segments, elbows, etc. For this purpose one of the two segments to be coupled together is provided, at one end, with a female portion and the other of the two segments to be coupled together is provided, at one end, with a male portion, which one ends of the two segments are designed such that the male and female end portions can be interconnected with a fit, such as a slip fit. The male portion may have a gasket, such as a lip seal, on its outer circumference for sealing against the inner circumference of the female portion, when the segments are coupled together.

Coupling together of two double-walled segments with a male portion and a female portion, respectively, at one end is more complicated than coupling together of two single-walled segments. This is because interconnecting of the male and female end portions of two double-walled segments requires, in fact, connecting of four tubings, which connecting, to be time-effective, should be done simultaneously, in a single push-together movement. To achieve this, there must be a perfect alignment between the male and female end portions of the segments to be interconnected. However, no such perfect alignment can be achieved quickly in practical application, especially not when the coupling of the segments is to be done in overhead areas, e.g. near the ceiling of a building, requiring raised arms of the installer, or in confined spaces. The difficulty involved is illustrated in FIG. 1, relating to prior art technique for coupling together two double-walled segments 1 and 2. When these two segments are to be coupled together at their male and female end portions and there is no alignment between them, the protruding inner tube 2A, defining a male portion, of segment 2 binds on or snags the inner tube 1A, defining a female portion, of segment 1. Attempts to adjust the inner tubes 1A and 2A for alignment, thereby making them capable of a slip fit, does not assure that the outer tubes or casings 1B and 2B will also have an orientation which is correct for a slid fit between the outer casings 1B and 2B. Such a situation requires repeated efforts to be made by the installer in order to make both the inner tubes 1A and 2A and the outer casings 1B and 2B register in alignment, such that a correct overlapping slip fit connection between all four tubes 1A, 1B and 2A and 2B, respectively, can be made. As understood, such efforts are more accentuated, when dealing with inner tubes/outer casings having a non-circular cross section, e.g. oval or rectangular (square), which is preferred by some customers.

There is another aspect, specially related to coupling of two double-walled segments, having an insulating material filling the space between the inner wall and the outer wall, for use in a ventilation system. This aspect is the prevention of the insulating material, mostly fibrous material, e.g. glass fiber, from being drawn into the air duct, i. e. the inner tube thereof, which would impair the sound-absorbing effect of the air ductwork and also would entail the risk of breathing in fibrous material. In U.S. Pat. No. 5,081,342 a fluid-impermeable cover is applied on the outside of the perforated inner tube for said prevention. However, no mention is made there of how to prevent insulating material from being drawn into the air duct in a joint or connection between two double-walled segments.

SUMMARY OF THE INVENTION

An object of the invention is to eliminate the drawbacks mentioned above by providing an improved double-walled structure, making it possible to connect two double-walled segments together in a simple way. This object is achieved by a double-walled structure according to the attached claims.

Thus, the structure according to the invention requires only that the outer casings of two double-walled segments to be coupled together have a male part and a female part, respectively, to be interconnected, making the coupling easier than the prior art technique, requiring coupling of four tubes. The seal(s) provide support when carrying out the connection of the male/female ends of the two outer casings and isolate the insulation from the air stream in a ventilation ductwork system. The seals further may have the function of the batting/filling in the space between the inner tubes and outer casings of the segments, e.g. a sound absorbing function, and/or a thermal insulation function in the joint between the coupled segments.

BRIEF DESCRIPTION OF THE DRAWINGS

The invention will now be described in more detail with reference to the accompanying drawings which show preferred embodiments of the invention and in which:

FIGS. 4a–4c are perspective views illustrating steps of mounting of a seal in the space between the inner tube and the outer casing, according to the invention.

DESCRIPTION OF PREFERRED EMBODIMENTS

Figure 2:
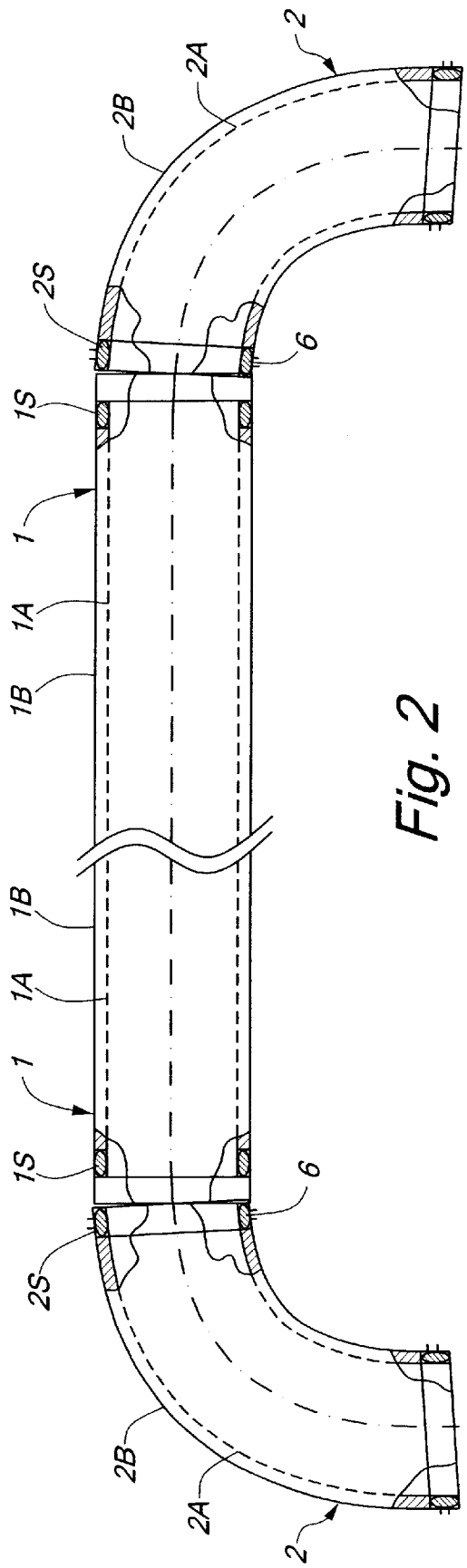
FIG. 2 is a view similar to FIG. 1, schematically illustrating the invention.
Figure 1:
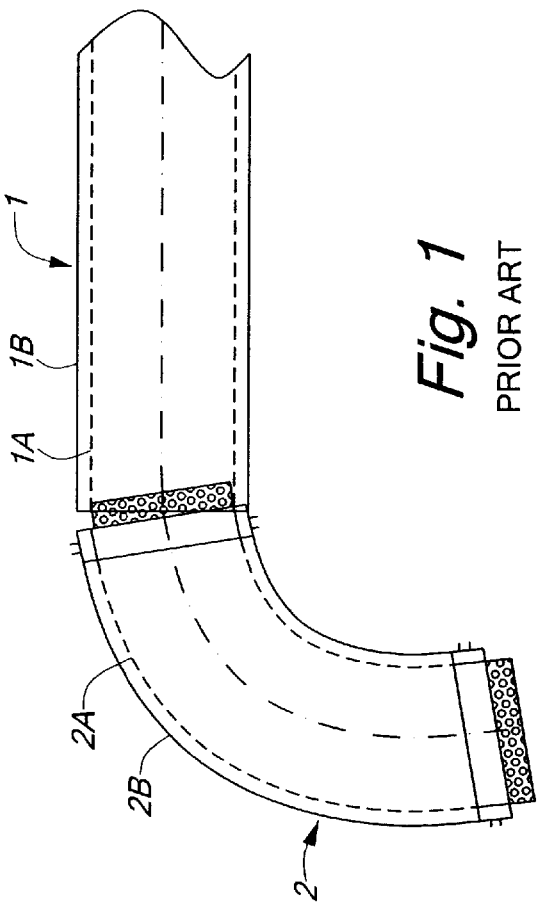
FIG. 1 is a longitudinal cross-sectional view of two prior art double-walled segments in a state of intercoupling, as referred to above.

With reference to FIG. 2 there are shown two double-walled segments 1 and 2 for coupling together. Segment 1 has an inner tube 1A and an outer casing 1B, and segment 2 has an inner tube 2A and an outer casing 2B. Tube and casing 1A, 1B are circular in cross section and concentric and tube and casing 2A, 2B are circular in cross section and concentric. There is a space between the inner tube 1A and the outer casing 1B, and there is a space between the inner tube 2A and the outer casing 2B, which spaces are filled by a insulation, here a sound absorbing batting 1C, 2C, respectively, typically fiber glass.

The double-walled segment 1 and/or 2 can be straight or bent (be e.g. an elbow) or can have other configuration, having at least one end designed, according to the invention, for connection to one end, of possibly several ends, of another double-walled segment. Thus, segments 1 or 2 can each have e.g. X- or Y-configuration, having four or three, respectively, connecting end portions. In the illustrated embodiment, FIG. 2, segment 2 is an elbow and segment 1 can be a straight segment, which segments are to be coupled together as parts of a silenced ductwork system. The segments illustrated here are made up by locked seamed portions, as illustrated by the reference sign L in FIG. 3.

Figure 3:
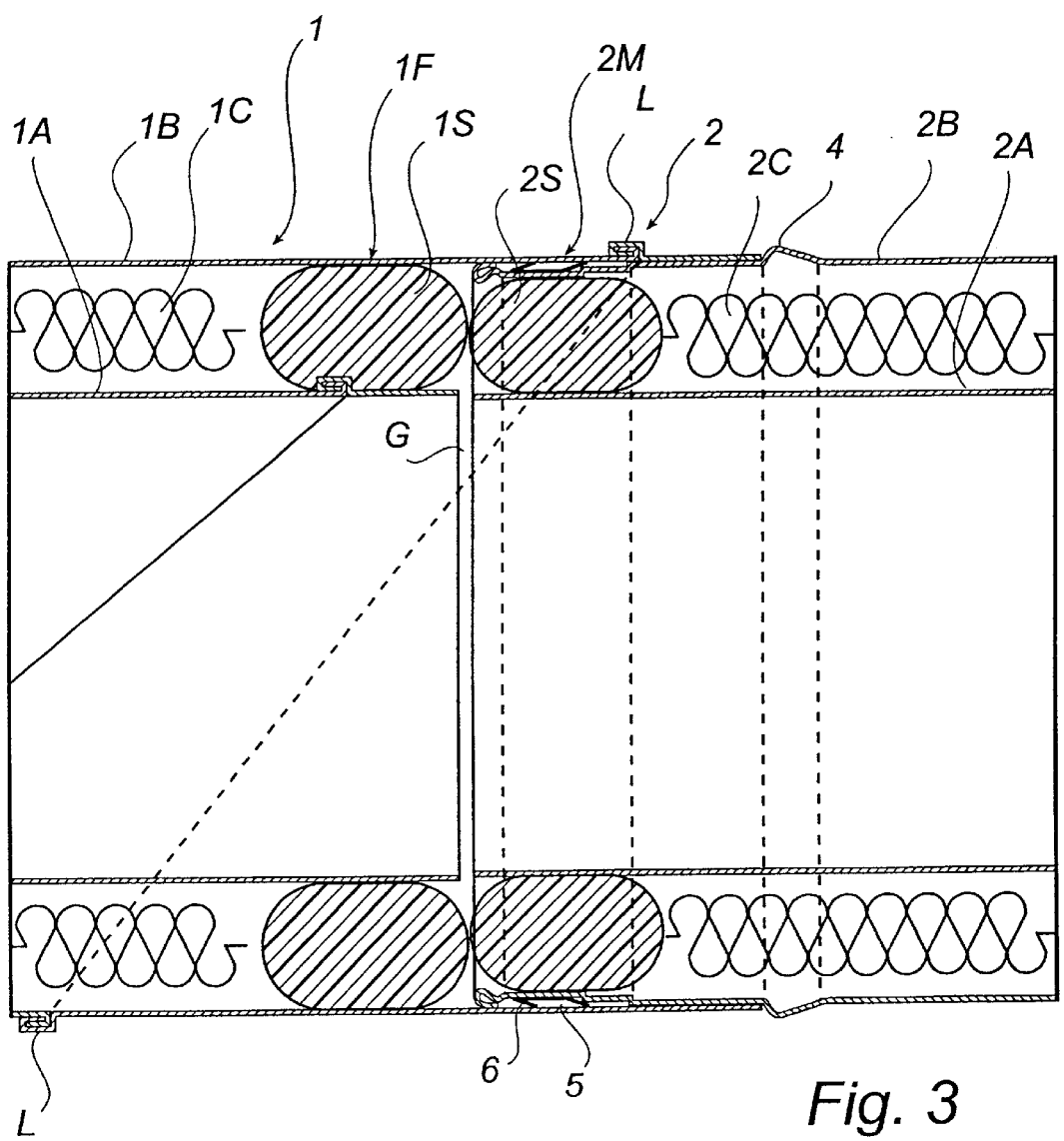
FIG. 3 is an illustration of the joint or connection according to one embodiment of the invention.

FIG. 3 illustrates connected end portions of segments 1 and 2 corresponding to the facing end portions of segments 1 and 2 of FIG. 2, but can represent connected end portions of segments 1 and 2 of whatever kind (stright/elbow/X-/Y-pieces or fittings).

For the connection purpose, the one end portion of segment 1 has a female portion 1F and the one end portion of segment 2 has a male portion 2M. The female and male end portions 1F and 2M are designed for a slip or slide fit together, coupling the sections 1, 2 together by interconnecting the female and male portions 1F and 2M.

In the female end portion 1F of segment 1 the end of the inner tube 1A is retracted within the outer casing 1B. In the male end portion 2M of segment 2 the ends of the inner tube 2A and the outer casing 2B are flush with each other. Thus, with overlapping connected ends of the outer casings 1B and 2B, a gap G can exist between the facing ends of the inner tubes 1A and 2A.

The inner tubes 1A and 2A of segments 1, 2 have the same diameter, which is, however, not necessary, i. e. the inner tubes 1A and 2A can have different diameters. In the male end portion 2M of segment 2 the outer diameter of the casing 2B is smaller than the outer diameter of the casing 1B in the female end portion 1F of segment 1, such that the male portion of segment 2 can be pushed into the female portion of segment 1 with a slip fit. The male portion of segment 2 may have a recess 5 occupied by a gasket 6, defining a pressure leak stop to the outside.

Said pushing is made quickly because the end of the inner tube 1A is retracted. Thus, according to the invention, and in contrast to the above prior art technique, coupling together or interconnection of two double-walled segments only requires, effectively, making only the one end portions of the outer casings 1B and 2B to male/female parts, fitting together with a slip fit, in an overlapping relationship, for coupling of the segments 1 and 2 together.

For preventing meeting of the two inner tubes 1A and 2A and ensuring a gap G therebetween (FIG. 3) in the interconnected state there is provided a stop for the pushing together of the segments 1 and 2, here defined by an outward bulge 4 made in the outer casing 2B of segment 2, provided at a suitable distance from the free end of the outer casing 2B. Such a stop in form of an outward bulge in the outer casing of the male part of double-walled segments intended for coupling is common within the art.

Further reference is made to FIG. 3 and FIGS. 4a–4c. A seal is provided in the female and male end portions 1F and 2M, respectively, of the segments 1 and 2. These seals are denoted 1S and 2S. They are of an resilient material and in a relaxed state tubes of rubber or a similar material, capable of being compressed, in the diameter direction, and thereafter pushed into the female and male end portions 1F and 2M of the segments 1 and 2, between the inner tube 1A and the outer casing 1B and between the inner tube 2A and the outer casing 2B, respectively, with a snug fit. The seal 1S is placed between tube 1A and outer casing 1B in such a way that it fills the space between a free end portion of the retracted inner tube 1A and the opposite portion of the outer casing 1B, protruding slightly beyond the free end of tube 1A, leaving the female end portion of the outer casing 1B free for connection to the segment 2. The seal 2S is placed between the flushing end portions of tube 2A and the outer casing 2B protruding slightly beyond the free ends thereof.

In this embodiment, the seals 1S, 2S are provided for meeting in the gap G, thereby closing off the gap G between the inner tubes 1A and 2A, when the segments 1 and 2 are connected. Thereby the seals 1S, 2S not only prevent the fibrous material of the sound absorbing batting 1C and 2C from being drawn into the inner tubes 1A and 2A, via the gap G, but they also form a sound absorbing bridge between the sound absorbing battings 1C and 2C. They further form a thermal inslutation in the coupling joint between the segments 1 and 2, thereby preventing or hampering condensation on the outer surface of the connection joint.

In another embodiment, not shown, the seals 1S and 2S do not meet in the gap G. With such an embodiment the main task can simply be to couple the two segments 1, 2 together in a simple way, by connecting only the outer casings thereof, without regard to insulation aspects in the joint, with a simple and simple pushing together movement, as referred to above. The seals 1S, 2S will also in such an embodiment keep the distance between the inner tube-outer casing combinations 1A, 1B and 2A, 2B, respectively, thereby preventing sagging of the joint between the joint between the segments 1 and 2.

FIGS. 4a–4c illustrate the above mentioned steps of placing a seal 1S (or 2S). Stage 1, denoted with 1 within a circle, is providing a straight tube 1S' (or 2S') with the required length for snugly fitting, when rolled to an end-to-end position, into the annular space, see above, of the female (male) end portion of the segment 1 (or 2), and rolling the straight tube 1S' (or 2S') into an annulus, arrows A1. Step 2, denoted with 2 in a circle, is compressing the thus formed annulus 1S" (or 2S") to a flat form, arrows A2. Step 3, denoted with 3 in a circle, is pushing the compressed annulus 1S (or 2S) into the female end portion of the segment 1 (or the male portion of the segment 2), arrows A3.

Thus, when coupling together of the segments 1 and 2, the seals 1S and 2S will meet, thereby providing a seal of the overlapping joint, formed of the male/female parts of the outer casings 1B and 2B, between the segments 1 and 2 for preventing sucking of fibres and preventing condensation, as said above.

The seals 1S and 2S can also be pre-fabricated annular rings. If straight as above, the tube 1S and the tube 2S can be connected at their free ends, by a suitable adhesive, to annular rings before insertion in the connecting end portions of the segments 1 and 2. Alternatively, the seals 1S and 2S can be in a form of other shapes than annular rings, as long as they seal off and meet according to the above. Annular rings are preferred, because they can be rolled into said spaces between the tubes/casings 1A, 1B and 2A, 2B, respectively.

For ensuring meeting of the seals 1S and 2S in the gap G , the stop for the pushing together of the segments 1 and 2, here defined by the above mentioned outward bulge 4, made in the outer casing 2B of segment 2, is placed such that said meeting is ensured before said stop. In other embodiments, such as the above disclosed embodiment with no meeting between the seals, the stop is provided such that no meeting will take place when the segments are connnected.

The other, not in detail shown ends of the segments 1 and 2 may have the same arrangement for connection and sealing as disclosed above, i.e. a female arrangement for segment 1 and a male arrangement for segment 2. Alternatively, segment 1 may have, at its other end, the male arrangement of segment 2 disclosed above, and segment 2 may have, at its other end, the female arrangement of segment 1 disclose above. Alternatively, one or both the other ends of segments 1 and 2, according to FIG. 2, may have a closing cap of any suitable design, if used as end segments in a ductwork system.

According to another embodiment of the invention, not shown, only one seal (S), closing off the gap G is used. This one seal is placed in such a way in the male portion 2M of segment 2 that it portrudes, from the space between the inner tube 2A and outer casing 2B, at the connection end of segment 2, into the space between the inner tube 1A and outer casing 1B, at the connection end of segment 1, sealing of the space between the outer circumference of the end portion of the inner tube 1A of segment 1 and an opposite end portion of the outer casing 1B of segment 1 and still leaving, ensured by a stop like the bulge 4, a gap between the inner tubes 1A and 2A and still ensuring a male-female interconnection of the outer casings 1B and 2B, without the necessity of interconnection the inner tubes 1A and 1B.

Figure 5:
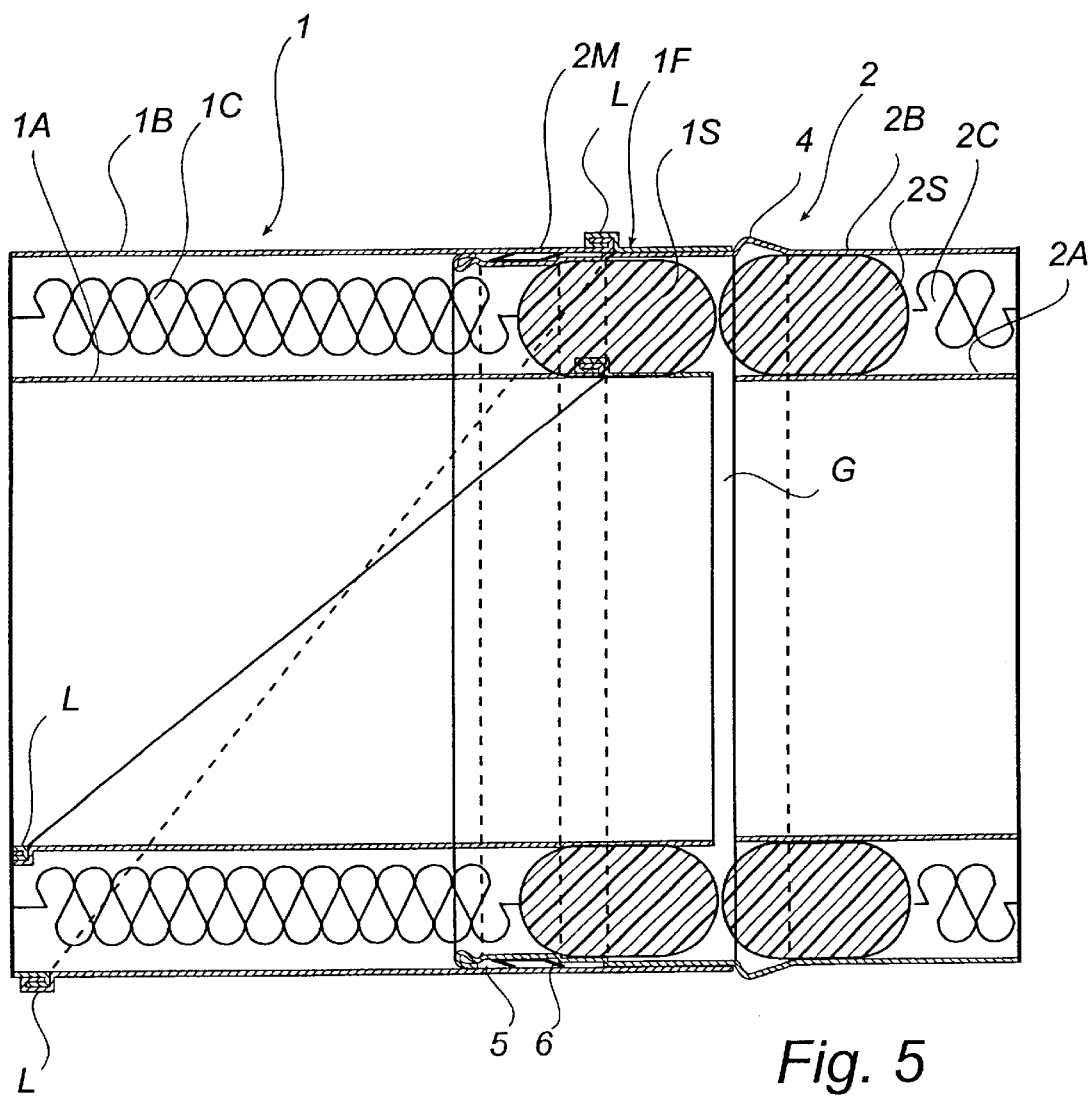
FIG. 5 is an illustration of the joint or connection according to another embodiment of the invention.

FIG. 5 illustrates another embodiment of a joint according to the invention with the same reference signs used for similar parts as in FIG. 3. In FIG. 5 the male end portion 2M of segment 2, defined by the outer casing 2B of segment 2, has a nose, 4 . e. the end of the inner tubing 2A thereof is retracted. The forward end of the seal 2S, placed in the space between the tube 1A and the casing 1B, projects into the gap G, defined between the inner tubes 1A and 2A. Meeting this forward end in the gap G is the forward, opposite end of the seal 1S, projecting into the gap G. This seal 1S is placed in a space defined by tire nose portion of the male part of segment 2M and the inner tube 1A. Before connection, the seal 1S is placed in the segment 1 in the end portion thereof, as above, filling out the space between the inner tube 1A and outer casing 1B of the female segment end, as shown. For connection, the male nose portion of the outer casing 2B is pushed through the interspace between the inner surface of the outer casing 1B and the opposite face of the seal 1S, until the opposite forward portions of the seals 1S and 2S meet in the gap, as determined by the stop 4.

As understood by the skilled person, the seals 1S, 2S can be, in the illustrated embodiments, made of the same tubing, requiring different compression, in the diameter direction for placement in the space between the end portions 1A, 1B and 2A, 2B, respectively. The seals can, alternatively be of different tubings, with different diameters or different compression characteristics.

The invention is by no way restricted to a circular cross section of the segments 1 and 2 or tubes 1A, 1B, 2A, 2B. Both the inner tubes 1A and 1B and the outer casings 2A and 2B may have another cross section; e.g. oval or rectangular (square), which is a special benefit of the invention, with regard to the fact that, according to the invention and in contrast to the prior art, only two female/male parts of two segments for making up/inclusion in a ductwork have to be connected in i single push-together movement, namely the end parts of the outer casings of segments 1 and 2.

Further, the invention is not restricted to a batting material, which is sound absorbing, between (one of) the inner tubes and outer casings. The batting can instead be of any kind of material, e.g. a fire-retarding material and/or a thermally insulating material. Likewise, the battings of the two segments to be coupled together, may be different.

The inner tubes 1A and 2A, and the outer casings 1B and 2B, of the segments 1 and 2 to be coupled together may be manufactured in any way, already known in the art. For the manufacture of straight segments helical wounding and lock-seaming might be suitable. For a sound absorbing ductwork, the inner tubes 1A and 2A may be, advantegously, perforated and covered by a cover according to the above mentioned US-patent. For other insulation purposes, e.g. for predominantly thermal insulation, solid inner tubes 1A and 2A might be preferred.

Further, no gasket 6 referred to above is always needed for carrying out the invention. The seals 1S and 2S (or an integrated seal S) might be enough for achieving the goals: sound absorbing, thermal insulation, prevenetion of condensation in the inner tubes, etc.

What is claimed is:

1. A double-walled structure, having at least one connection end portion, comprising:
    an inner tube having a free end at said connection end portion of the structure;
    an outer casing spaced from and enclosing said inner tube and having a free end at said connection end portion of the structure;
    a filler material provided between said inner tube and said outer casing; and
    a resilient sealing ring means provided between said inner tube and said outer casing,
    wherein said sealing ring means fills out the space between said end portion of the inner tube and a portion of the outer casing opposite thereto,
    wherein only the outer casing free end defines said connection end portion of the structure for slip fit connection to another double-walled structure, and
    wherein the sealing ring means has a portion protruding beyond said free end of the inner tube.

2. The double-walled structure of claim 1, wherein said sealing ring means protrudes also beyond the free end of the outer casing.

3. The double-walled structure of claim 1 having another connection end portion and having an arrangement similar to the arrangement of claim 1 at said other end portion of the structure.

4. The double-walled structure of claim 1, wherein an impression is formed into the outer casing, forming a stop.

5. A double-walled structure, having at least one connection end portion, comprising:
    an inner tube having a free end at said connection end portion of the structure;

an outer casing spaced from and enclosing said inner tube and having a free end at said connection end portion of the structure;

a filler material provided between said inner tube and said outer casing; and a resilient sealing ring means provided between said inner tube and said outer casing, wherein said sealing ring means fills out the space between said end portion of the inner tube and a portion of the outer casing opposite thereto, wherein only the outer casing free end defines said connection end portion of the structure for slip fit connection to another double-walled structure, and wherein the outer casing connection end portion is a female portion designed for receiving a male portion of an outer casing of another double-walled structure, the free end of the inner tubing being retracted within the outer casing.

6. A double-walled structure, having at least one connection end portion, comprising:

an inner tube having a free end at said connection end portion of the structure;

an outer casing spaced from and enclosing said inner tube and having a free end at said connection end portion of the structure;

a filler material provided between said inner tube and said outer casing; and a resilient sealing ring means provided between said inner tube and said outer casing, wherein said sealing ring means fills out the space between said end portion of the inner tube and a portion of the outer casing opposite thereto, wherein only the outer casing free end defines said connection end portion of the structure for slip fit connection to another double-walled structure, and wherein the outer casing connection end portion is a male portion designed for insertion into a female portion of an outer casing of another double-walled structure, the free end of the inner tubing being retracted within the outer casing.

7. The double-walled structure of claim 6, wherein the male part has a sealing gasket on its outer circumference for sealing against the inner circumference of said female portion.

8. A connection arrangement for coupling together of two double-walled segments for use in a ventilation duct system, of said segments one segment comprises a male connection end portion and the other segment comprises a female connection end portion said segments each including an inner tube having a free end at said connection end portion of the segment;

an outer casing spaced from and enclosing said inner tube and having a free end at said connecting end portion of the segment; and a filler material provided between said inner tube and said outer casing, the segment Male and female connection end portions being interconnected for coupling together of the two segments, wherein the ends of the inner tubes facing each other have a gap therebetween, wherein the outer casings have a respective male and female portion interconnected with an overlapping slip fit, wherein a resilient seal means is arranged in a space between the inner tube and outer casing of at least one of the segments filling out said space, and wherein the resilient seal means protrudes from said space between the inner tube and the outer casing of each one of the segments, which seals meet in the gap (G), closing the gap (G) off.

9. The connection arrangement according to claim 8, wherein the filler material is a sound absorbing material.

10. The connection arrangement according to claim 8, wherein the filler material is a thermal insulating material.

11. A connection arrangement for coupling together of two double-walled segments for use in a ventilation duct system, of said segments one segment comprises a male connection end portion and the other segment comprises a female connection end portion, said segments each including an inner tube having a free end at said connection end portion of the segment;

an outer casing spaced from and enclosing said inner tube and having a free end at said connecting end portion of the segment; and a filler material provided between said inner tube and said outer casing, the segment male and female connection end portions being interconnected for coupling together of the two segments, wherein the ends of the inner tubes facing each other have a gap therebetween, wherein the outer casings have a respective male and female portion interconnected with an overlapping slip fit, wherein a resilient seal means is arranged in a space between the inner tube and outer casing of at least one of the segments filling out said space, and wherein the resilient seal means protrudes from the space between the inner tube and the outer casing of one of the segments into the space between the inner tube and the outer casing of the other one of the segments.

* * * * *